United States Patent

Tago

[15] 3,700,764
[45] Oct. 24, 1972

[54] PROCESS FOR THE PRODUCTION OF SYNTHETIC RESIN PIPES

[72] Inventor: Satoshi Tago, Yokkaichi, Japan

[73] Assignee: Mitsubishi Petrochemical Co., Ltd., Tokyo, Japan

[22] Filed: Dec. 28, 1970

[21] Appl. No.: 101,667

[30] Foreign Application Priority Data

Dec. 27, 1969    Japan .................... 44/104952

[52] U.S. Cl. ................. 264/273, 264/275, 264/310, 264/311
[51] Int. Cl. ....................................... B 29 C 5/04
[58] Field of Search .............. 264/310, 311, 270, 273; 18/26 RR; 25/30 C

[56] References Cited

UNITED STATES PATENTS

| | | | |
|---|---|---|---|
| 2,859,151 | 11/1958 | Usab et al. | 264/311 X |
| 3,555,142 | 1/1971 | Haener | 264/311 |

*Primary Examiner*—Robert F. White
*Assistant Examiner*—Allen M. Sokal
*Attorney*—Sughrue, Rothwell, Mion, Zinn & Macpeak

[57] ABSTRACT

A process for the production of pipes having excellent anti-flattening characteristics under a load comprises the steps of placing in a metallic mold capable of being rotated, a reinforcing frame having a shape capable of being rotated in the metallic mold by rotation of the same and a powdered synthetic resin, heating the resin to melt the synthetic resin and cause it to adhere to the inside surface of the metallic mold, whereby a pipe containing the reinforcing frame material therein is formed, and after solidifying the pipe by cooling, recovering the pipe.

2 Claims, 10 Drawing Figures

FIG. 5A
FIG. 5B
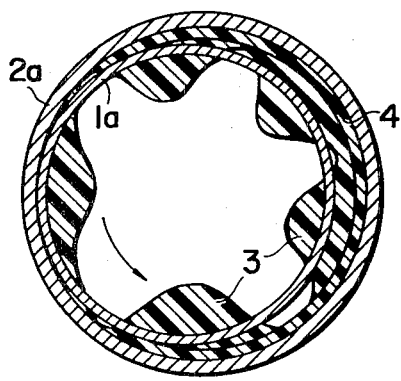
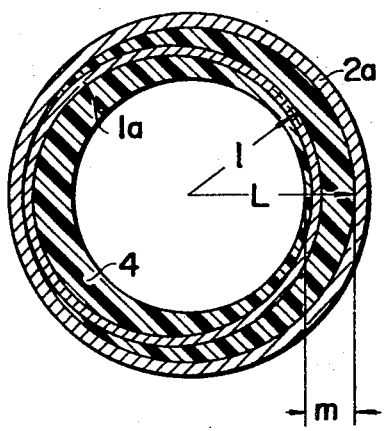
FIG. 6
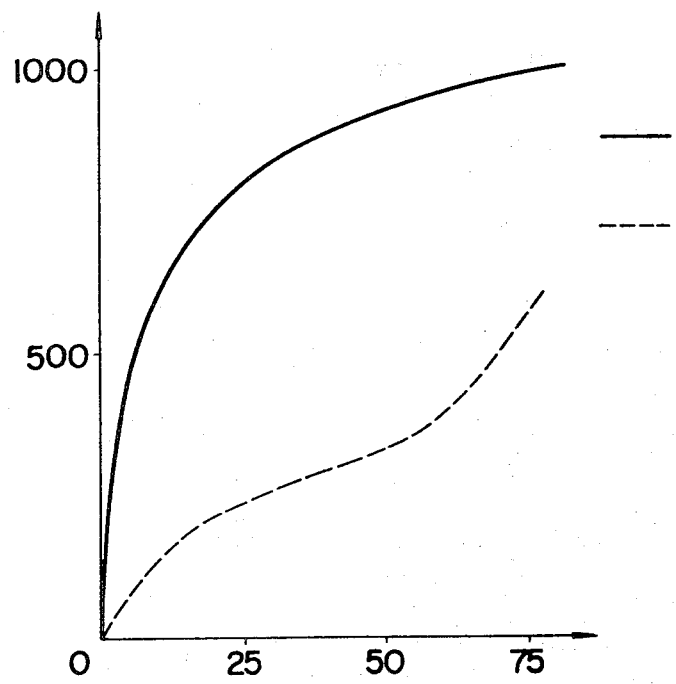

PROCESS FOR THE PRODUCTION OF SYNTHETIC RESIN PIPES

BACKGROUND OF THE INVENTION

1. Field of the Invention

The present invention relates to a process for the production of a synthetic resin pipe incorporating a reinforcing frame of iron, steel aluminum, glass fiber reinforced plastic, etc.

2. Description of the Prior Art

In general, it is conventional in, for example, concrete pipes to reinforce a hollow pipe by inserting reinforcing steel, etc., in the wall of the pipe but in the case of producing such pipes, it is necessary to fix the reinforcing material to a mold to be inserted in the wall of the pipe by some manner.

In particular, in the case of molding a synthetic resin hollow pipe, as in the present invention, by ordinary injection molding, if the reinforcing frame is not firmly supported in a mold, the reinforcing frame moves under the flow of the molten resin during molding and hence does not stay at a definite position. Also, a hollow pipe prepared by molding while supporting a reinforcing frame by the metallic mold using metallic fittings has various faults. Since the supporting metallic fittings are exposed on the surface of the plastic pipe, the appearance is marred. The metallic fittings are corroded, and further water enters the wall of the plastic pipe through the space between said metallic fittings and the plastic, whereby the reinforcing frame is corroded.

SUMMARY OF THE INVENTION

The present invention, which overcomes the aforesaid difficulties relates to a process for the production of a synthetic resin pipe having a reinforcing frame therein by rotary molding, that is, a process wherein a single-axially-rotating metallic mold containing therein synthetic resin powder is heated to melt the synthetic resin and cause it to adhere to the inside surface of the metallic mold and to form a uniformly welded layer. The molten layer is solidified by cooling, and the pipe thus formed is taken out. The invention is characterized in that a reinforcing frame having a shape capable of being rotated in the metallic mold during the rotary molding is placed in the metallic mold, whereby the reinforcing frame is embedded in the layer of the pipe thus solidified.

An object of this invention is to provide a process for producing a synthetic resin hollow pipe having a reinforcing frame therein and having excellent anti-flattening characteristics under load.

Another object of this invention is to provide a process for producing a synthetic resin pipe, which accurately embeds a reinforcing frame material concentrically in the wall of the hollow synthetic resin pipe.

Still another object of this invention is to provide a process for the production of a synthetic resin pipe in which the reinforcing frame is embedded completely in the wall of the synthetic resin pipe without being exposed on either surface thereof, whereby the reinforcing frame material is prevented from being corroded.

A further object of this invention is to provide a process for producing a synthetic resin pipe having a reinforcing frame material therein in which during solidifying by cooling a synthetic resin pipe after molding by heating in a metallic mold, the synthetic resin pipe thus formed has reduced shrinkage and the solidified synthetic resin pipe has precise dimensions.

BRIEF DESCRIPTION OF THE DRAWINGS

The process of this invention will be explained by the embodiments illustrated in the accompanying drawings, in which:

FIGS. 5A and 5B are cross sectional views showing the rotary molding mode at high speed.

FIG. 6 is a graph showing the anti-flattening load strengths of the synthetic resin pipe incorporating a reinforcing frame prepared by the process of this invention and a conventional synthetic resin pipe.

DESCRIPTION OF THE PREFERRED EMBODIMENTS

Figure 1:
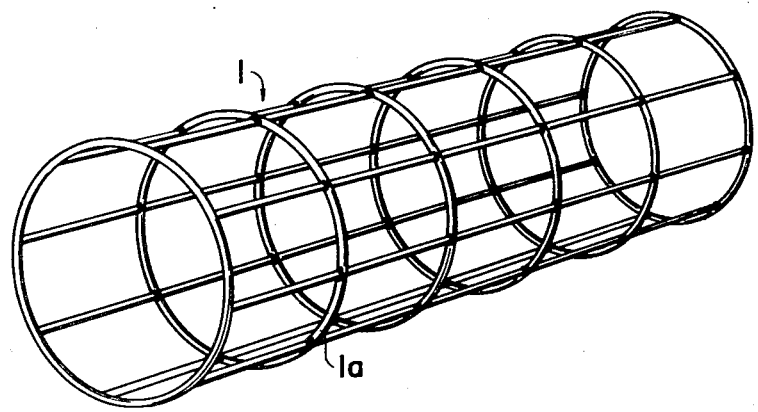
FIG 1 is a perspective view of an example of the reinforcing frame skeleton structure employed in the present invention.
Figure 3A:
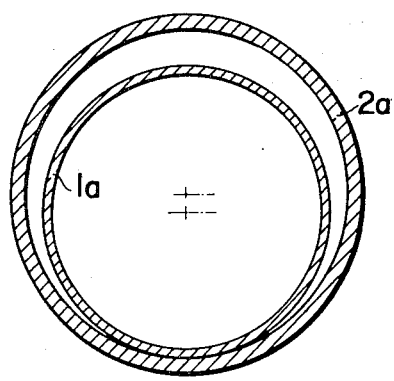
FIGS. 3A, 3B, 3C and 3D are cross sectional views showing the mode of producing a synthetic resin pipe by a rotary molding method using the above-mentioned skeleton or reinforcing frame.
Figure 3B:
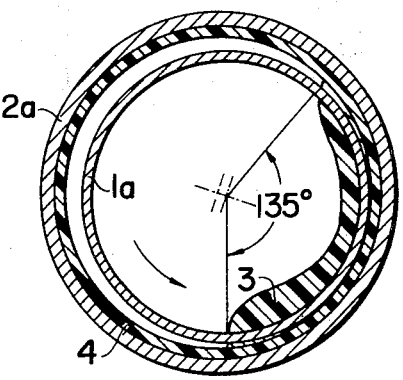
Figure 3C:
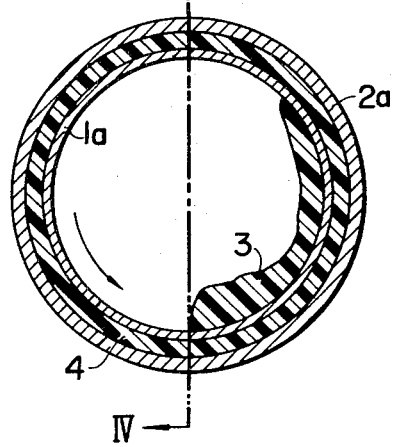
Figure 3D:
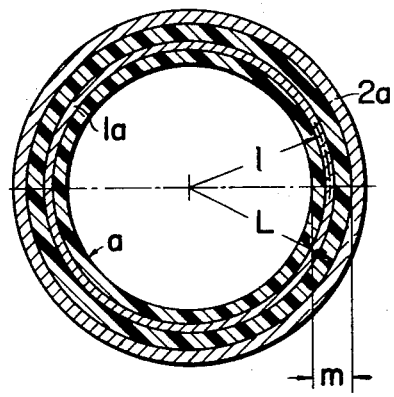

A reinforcing frame material 1 shown in FIG. 1 is of a size capable of being inserted in a cylindrical metallic mold body 2a shown in FIGS. 3A to 3D or FIG. 4, and also has a radius $l$ not less than the inner radius of a synthetic resin pipe $a$ having a thickness of $m$ and having an outer radius L to be molded in the metallic mold 2 by rotary molding and not greater than said outer radius L of the synthetic resin pipe as shown in FIG. 3D.

The reinforcing frame 1 shown in FIG. 1 is placed in the metallic mold 2 as shown in FIG. 3A, that is, the reinforcing frame 1 is in such an eccentric position relative to the metallic mold body 2a, that the lower end of the reinforcing frame 1 contacts the bottom of the metallic mold body 2a.

Figure 2:
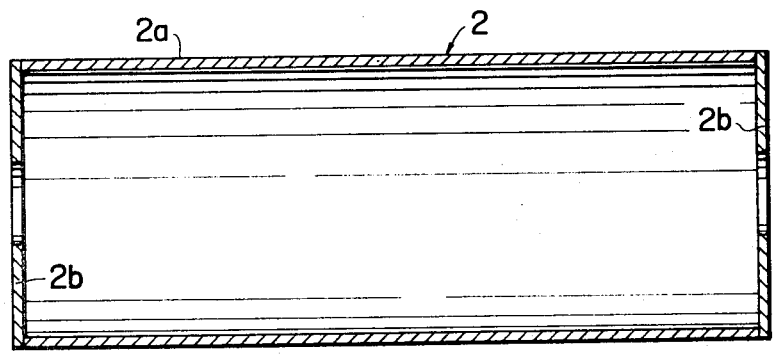
FIG. 2 shows a cross sectional view of a metallic mold capable of being rotated.

Thereafter, discs 2b made of heat conductive material such as iron and the like and having a hole at the center are fixed to the opposite ends of the metallic mold body 2a as shown in FIG. 2 and the metallic mold is rotated by means (not shown), whereby the reinforcing frame material 1 begins to rotate along the inside wall of the metallic mold body 2a.

While heating the rotating metallic mold 2 in this state from the circumference of said mold 2 by means of burners and the like (not shown), a powdered synthetic resin 3 is added in the metallic mold 2. As shown in FIG. 3B, the reinforcing frame material 1 rotates along the inside wall of the metallic mold as mentioned above, while the powdered synthetic resin 3 flows along the inside wall of the metallic mold body 2a and is then melted and adheres gradually to the inside wall. In this case, a phenomenon does not occur wherein the reinforcing frame 1 sticks to the resin 4 adhered to the inside wall of the metallic mold body 2a and rotates together with the metallic mold 2. In other words, when the reinforcing frame 1 stuck to the resin 4 is moved upwardly by the rotating metallic mold, it backs down by its own weight and hence the reinforcing frame is always maintained in the state shown in FIG. 3B in which it rotates along the bottom portion of the inside wall of the metallic mold body 2a.

Furthermore, since the metallic mold 2 is rotated and the reinforcing frame material 1 rotates in the metallic mold 2, the reinforcing frame material does not sink in the molten resin 4 at the bottom portion of the metallic mold by the weight thereof.

Figure 4:
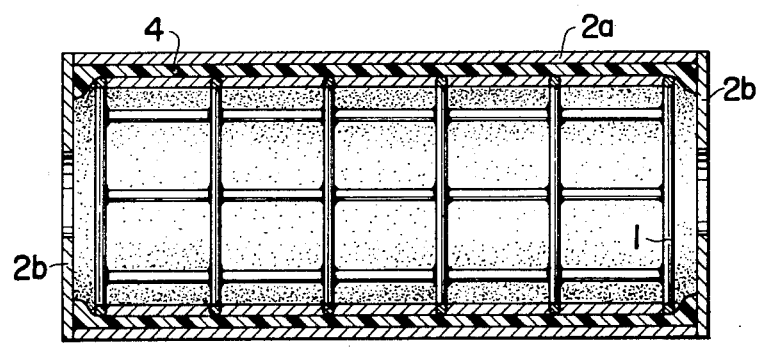
FIG. 4 is a cross sectional view taken along the line IV — IV of FIG. 3C.

Moreover, as shown in FIG 4, the thickness of the molten resin 4 increases at opposite ends thereof by the heat from the discs 2b, whereby the reinforcing frame 1 is automatically positioned at a longitudinal central position in the metallic mold during the rotation.

Thus, when the resin 3 melts and adheres gradually to the inside wall of the metallic mold body 2a and the inner radius of the layer of the molten resin 4 formed on the surface of the inside wall, adhesion equals the outer radius $l$ of the reinforcing frame 1 are completely attached to the molten resin 4 as shown in FIG. 3C. In this case, since the metallic mold 2 is rotated and hence the powdered resin 3 conforms to the inside wall of the metallic mold body 2a, the thickness of the layer of the molten resin is uniform or constant and hence the reinforcing frame 1 attached to the molten resin layer 4 is not eccentric to the mold but in a coaxial state with the metallic mold body 2a.

Thereafter, the remaining powdered synthetic resin is melted and finally the state in which the reinforcing frame 1 is completely embedded within the molten resin layer 4 forming the pipe $a$ having a thickness $m$ and an outer radius L as shown in FIG. 3D, and then the molten resin layer is solidified by cooling.

Now, if the speed of rotating the metallic mold 2 is increased, an angle of repose of the powdered resin is increased by the centrifugal force as shown in FIG 5A at the stage of adding the powdered synthetic resin in the rotating metallic mold, and finally, the molten resin is pressed onto the inside wall of the metallic mold body 2a and rotated together with the metallic mold 2. Also, the reinforcing frame material 1 is attached to the molten resin at a point by the centrifugal force of itself and the adhesive force with the molten resin 4, whereby the reinforcing frame 1 is rotated together with it and finally, the state in which the reinforcing frame 1 is embedded in the molten resin layer 4 in an eccentrical position to the mold as shown in FIG. 5B is achieved.

In other words, since in a conventional case of molding concrete pipes, the viscosity of the raw material is low, the material is molded at a high speed rotation and, hence, the reinforcing frame material or skeleton is required to be fixed to the mold. On the other hand, in the process of this invention, a synthetic resin can be molded at a low rotating speed owing to the high viscosity of the resin and hence the molding can be conducted by only placing the reinforcing frame in the metallic mold without fixing the reinforcing frame to the mold.

In addition, low speed rotation in this invention means such peripheral speed that the reinforcing frame material can rotate in the metallic mold 2 and a molten resin 3 can flow along the inside wall of the mold, that is, the metallic mold is rotated at such peripheral speed that the rising angle of the raw material by the rotation of the metallic mold 2 is within about 135° from the vertical direction.

The material forming reinforcing frame 1 may be any of various hard materials such as a metal, e.g., iron, steel, aluminum or copper or a reinforced plastic. If the reinforcing frame 1 is too slender, it cannot provide sufficient strength to the pipe molded, while if the frame material 1 is too thick, a portion is exposed by the shrinkage of the resin after molding. Accordingly, it is proper that the diameter of the elements for the reinforcing frame 1 be less than one-fifth of the thickness of the wall of the synthetic resin pipe.

Now, the invention will be explained by the following example.

EXAMPLE

The metallic mold body 2a for molding pipe was a mold made of iron having a thickness of 3 mm., an inside diameter of 300 mm., and a length of 400 mm. The resin used was high density polyethylene having a melting index of 6 and a specific gravity of 0.950. The reinforcing frame 1 was made of iron wires each having a diameter of 4.0 mm. and by using six straight wires and eight circular wires, a reinforcing frame material 1 having a diameter of 280 mm. and a length of 380 mm. was formed.

The rotation speed of the metallic mold at molding was 25 r.p.m.

First, the reinforcing frame 1 was placed in the metallic mold body 2a and after fixing discs 2b at the opposite ends of the mold, the metallic mold 2 was heated while rotating and a powdered resin 3 was added gradually to the metallic mold 2. The resin was molded, and welded gradually to the inside wall of the mold as shown in FIG. 3B.

On the other hand, the reinforcing frame 1 continues to rotate at the bottom of the metallic mold and when the thickness of the resin 4 welded to the inside wall became 10 mm., the inside diameter of the welded resin layer become 280 mm., which coincided with the diameter of the reinforcing frame material 1, thereby the reinforcing frame material 1 attached completely to the welded resin.

The powdered resin 3 continues to be melted thereafter and, when the thickness $m$ of the welded resin layer became 20 mm., the supply of the raw material was stopped and the metallic mold 2 was cooled to solidify the molten resin. By opening the metallic mold 2 and taking out the product, a synthetic resin pipe $a$ having an outer diameter of 300 mm and a thickness of 20 mm, in which embedded the reinforcing frame material 1 as it is situated at the center of said pipe, was obtained.

In addition, when the rotation speed was increased to over 95 r.p.m. in the example, it was confirmed that the reinforcing frame material 1 was disposed at an eccentric position to the metallic mold body 2a as shown in FIG. 5B.

Each of the polyethylene pipes obtained by the above example and a control sample prepared by the same molding procedure without using the reinforcing frame was placed between two parallel pressing plates and compressed at a compressing speed of 50 mm./min. to conduct an anti-flattening load test. The distortion percentages to the the load per 5 cm in the axial length are shown in FIG. 5.

From these results, it will be understood that the anti-loading property of the product of this invention was remarkably higher than that of the control sample containing no such reinforcing frame and hence a synthetic resin pipe having a high practicability was obtained.

What is claimed is:

1. In a process for producing a synthetic resin pipe by rotary molding in which a synthetic resin powder is fed into a cylindrical metallic mold capable of being rotated horizontally about its axis, aid metallic mold being heated while rotating to melt the synthetic resin, the molten resin adhering to the inside wall of the metallic mold, and thereafter, the molten resin being solidified by cooling, and the pipe thus formed being taken out from the mold, the improvement comprising:

placing a hollow cylindrical reinforcing frame having an outer diameter not less than the inner diameter of the synthetic resin pipe to be molded and not greater than the outer diameter of the pipe in a free state generally coaxially within the metallic mold, and molding the resin while rotating the metallic mold at a peripheral speed such that the reinforcing frame rotates on the bottom of the metallic mold and the angle of rise of the resin by the rotation of the metallic mold is about 135° from the vertical, continuing to mold resin until the inside diameter of welded resin coincides with the diameter of said reinforcing frame, wherein the reinforcing frame becomes attached completely to welded resin, and continuing to melt the resin and rotate the mold until the reinforcing frame is embedded.

2. The process as claimed in claim 1, wherein said synthetic resin is high density polyethylene.

* * * * *